T. B. WORTHINGTON.
DEMOUNTABLE RIM LOCK.
APPLICATION FILED MAY 13, 1919.

1,371,832.

Patented Mar. 15, 1921.
2 SHEETS—SHEET 1.

Inventor
Tillman B. Worthington,

By G. Hume Talbert
Attorney

T. B. WORTHINGTON.
DEMOUNTABLE RIM LOCK.
APPLICATION FILED MAY 13, 1919.

1,371,832.

Patented Mar. 15, 1921.
2 SHEETS—SHEET 2.

Inventor
Tillman B. Worthington,

By
E. Hume Talbert
Attorney

UNITED STATES PATENT OFFICE.

TILLMAN B. WORTHINGTON, OF SCOTLAND, PENNSYLVANIA.

DEMOUNTABLE-RIM LOCK.

1,371,832. Specification of Letters Patent. Patented Mar. 15, 1921.

Application filed May 13, 1919. Serial No. 296,777.

*To all whom it may concern:*

Be it known that I, TILLMAN B. WORTHINGTON, a citizen of the United States of America, residing at Scotland, in the county of Franklin and State of Pennsylvania, have invented new and useful Improvements in Demountable-Rim Locks, of which the following is a specification.

The object of the invention is to provide relatively simple and efficient means for locking a demountable rim in place upon the usual or main wheel rim under such conditions as to provide for taking up lost motion due to wear, and to compensate for expansion and contraction incident to temperature and for unavoidable variations in the dimensions of the parts, so as to secure the same against relative vibration in use, and to this end the invention consists in a construction, combination and relation of parts of which a preferred embodiment is hereinafter particularly described, it being understood that changes in form and proportions may be resorted to within the scope of the appended claims without departing from the principle involved.

Figure 1:
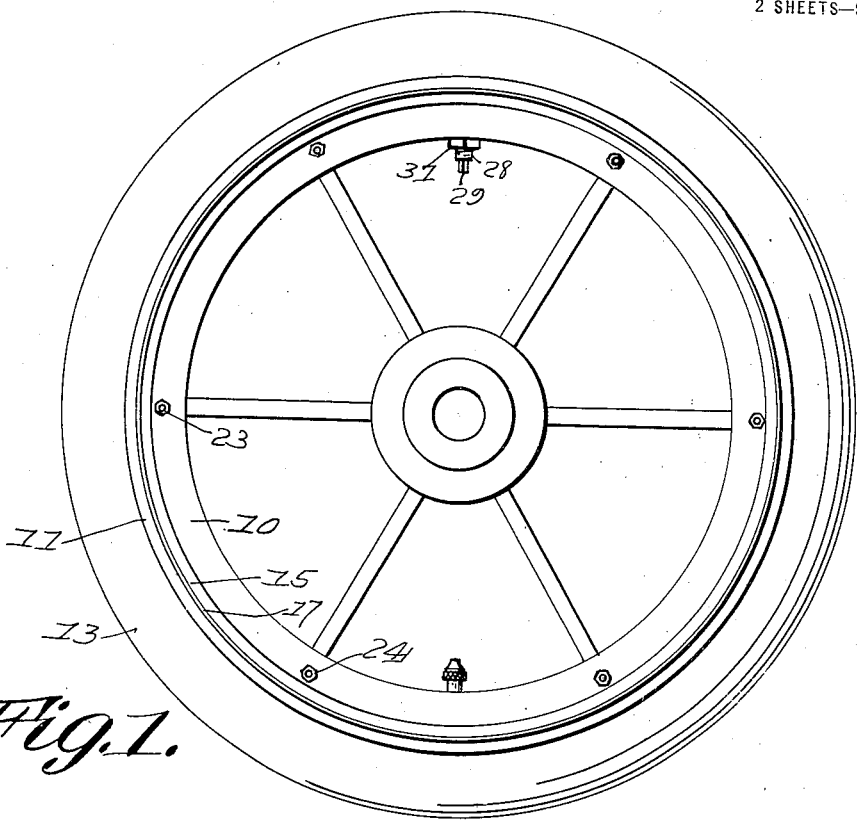
Figure 1 is a side view of a conventional automobile wheel provided with rim locking means embodying the invention, it being understood that the illustrated wheel is merely typical and may be variously modified as to structure, number of spokes and the like without affecting the means constituting the subject matter of this invention.
Figure 2:
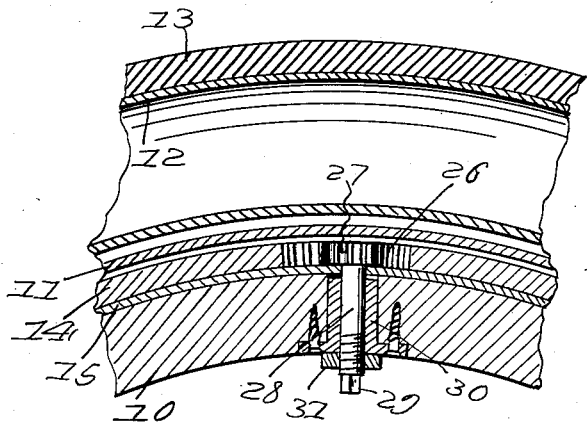
Fig. 2 is a detail sectional view taken longitudinally of the tire in the plane of the operating stem for the locking elements.

Merely for purposes of illustration the invention is shown in connection with a wheel having a felly 10, the demountable rim 11, inner tube 12 and casing 13, and occupying the space between said felly and demountable rim are the annular locking elements 14 and 15, of which the latter is the felly rim or fixed band and the former a ring for coöperating locking action therewith and mounted for simultaneous orbital and lateral movement.

As illustrated, the felly is slightly beveled at its periphery as shown at 16 to form an inclined bed or seat for the similarly inclined body portion of the fixed rim 15 which at one edge is upturned at an angle to form a cam or buffer 17 upon the surface of which one edge of the demountable rim bears, and by which an expansive strain is applied to said demountable rim.

Figure 3:
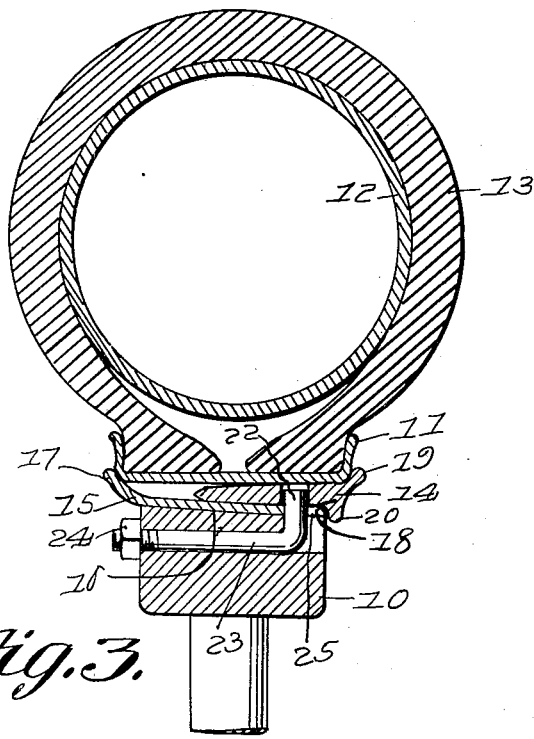
Fig. 3 is a transverse sectional view taken in the plane of one of the anchor pins.
Figures 4, 5:
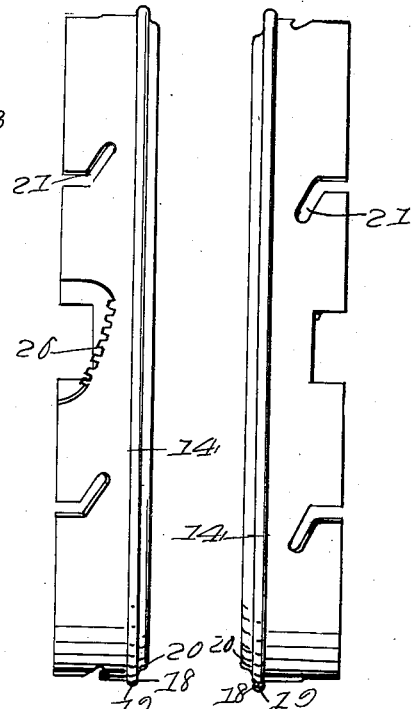
Figs. 4 and 5 are edge views showing opposite sides of the active locking element.
Figure 6:
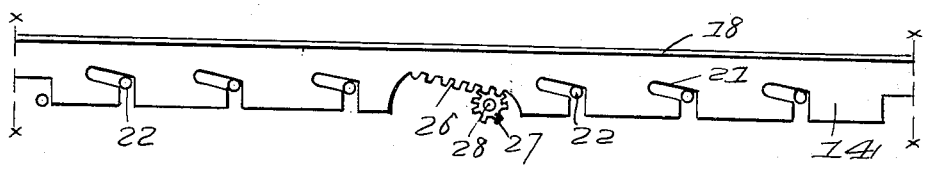
Fig. 6 is a developed view of the active locking element.
Figure 7:
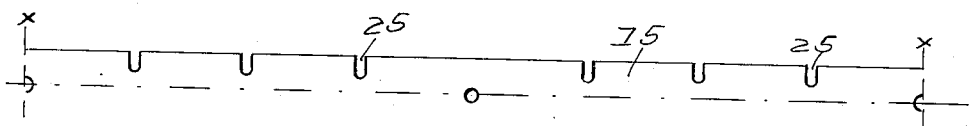
Fig. 7 is a similar view of the companion locking element or felly rim.

Seated upon the exterior surface of the body portion of this fixed rim is the locking ring 14, corresponding with the fixed rim but tapered in thickness from its outer toward its inner edge, as shown clearly in Fig. 3 with an external flared head 18 of which the upper bead 19 and lower bead 20 bear respectively against the edge of the demountable rim, and the adjacent edge of the fixed rim. Obviously, the inward movement of the locking ring, that is to say, the axial movement thereof relative to the fixed rim will cause the clamping of the demountable rim between the cam flange 17 of the fixed rim and the bead 19 of the locking ring while the wedge-like form of the body portion of the latter will have a spreading or expanding action upon the demountable rim, particularly when the movement thereof is in relation to the outer transversely inclined surface of the fixed rim, and this movement of the ring is effected by means of cam slots 21 formed in the locking ring in connection with studs 22 which constitute the terminals of anchor pins 23 mounted in and carried by the felly, as also shown clearly in Fig. 3. These anchor pins may be secured in place by means of engaging nuts 24 and the outwardly turned thrusts thereof which project radially from the surface of the felly passing through slots 25 in the edge of the fixed rim, so as to secure the latter against the rotary movement and gripping on the wheel rim, while the turning of the locking ring in the direction indicated by the arrow in Fig. 4 will cause the cam slots 21 to draw said ring inward and thus produce the clamping action above mentioned.

This turning or orbital movement of the locking ring may be produced, for example, by providing the same at any suitable point with an inclined toothed rack 26, engaged by a pinion 27 of which the stem or spindle projects to the inside of the felly and is provided with a wrench or key seat 29. Said stem or spindle is movable in a bearing sleeve 30 properly secured in the felly and a locking nut threaded upon the spindle serves to lock the latter and hence the rack and consequently the locking ring or member 14 in such position as in coöperation with the passive member to maintain the demountable rim in position.

In applying the device to a wheel, the fixed rim which forms the seat or bearing for the active member may first be positioned upon the felly, and after the demountable rim has been fitted thereover the locking ring may be applied from the opposite side after which the rotary or orbital adjustment thereof will lock the elements in their proper relations, it being understood that looseness may be taken up from time to time as may be required to compensate for variations of temperature and the like.

The invention having been described, what is claimed as new and useful is:

1. The combination with a felly and demountable rim, of a fixed rim and locking ring arranged in concentric overlapping relation between the two for clamping the latter, the said ring being provided with transversely directed cam slots for engagement with stationary guide studs and also having an obliquely disposed rack extending parallel with the slots, and an axially radial pinion mounted upon the felly for the engagement with said rack to impart rotary or orbital movement to said ring.

2. The combination with a felly and demountable rim, of a fixed rim and concentrically arranged overlapping ring interposed between the felly and the demountable rim and provided respectively at their outer edges with means for engaging the corresponding edges of the demountable rim, anchor bolts seated in the felly and forming outwardly directed studs projecting beyond the peripheral surface of the felly, the fixed rim being provided with slots for engagement with said studs and a ring being provided with cam slots for engagement with the studs, and means for imparting rotary or orbital movement to the ring.

3. The combination with a felly and demountable rim, of a fixed rim and associated overlapping locking ring carried on the felly and provided each with means for respectively engaging the opposite edges of the demountable rim, radial guide studs carried by and projecting beyond the periphery of the felly, the said ring being provided with cam slots in which said studs engage, a radial bearing mounted in the felly, a spindle mounted in the bearing, the locking ring being provided with an obliquely disposed rack paralleling the cam slots, a pinion carried by the spindle and meshing with the rack, and locking means for the spindle to preclude rotary movement of the same.

In testimony whereof he affixes his signature.

TILLMAN B. WORTHINGTON.